United States Patent [19]

Kirschner

[11] Patent Number: 4,989,953

[45] Date of Patent: Feb. 5, 1991

[54] VIDEO DISPLAY TERMINAL FILTER

[76] Inventor: Kevin A. Kirschner, 1010 Rancho Rd., Corona, Calif. 91720

[21] Appl. No.: 301,238

[22] Filed: Jan. 24, 1989

[51] Int. Cl.[5] .......................... G02B 5/20; H04N 5/65

[52] U.S. Cl. ................................ 350/311; 350/276 R; 350/314; 358/247; 358/252

[58] Field of Search ................... 350/311, 314, 276 R, 350/284, 322; 358/245, 247, 252, 253; 425/141

[56] References Cited

U.S. PATENT DOCUMENTS

| | | | |
|---|---|---|---|
| 3,382,183 | 5/1968 | Donoian et al. | 350/311 |
| 3,382,393 | 5/1968 | Schwartz | 350/311 |
| 3,582,189 | 6/1971 | Moritz et al. | 358/252 |
| 3,873,863 | 3/1975 | Robinder | 358/247 |
| 3,957,354 | 5/1976 | Knop | 350/314 |
| 4,246,613 | 1/1981 | Choder et al. | 358/245 |
| 4,253,737 | 3/1981 | Thomsen et al. | 350/276 R |
| 4,504,867 | 3/1985 | Keller | 358/247 |
| 4,633,322 | 12/1986 | Fourny | 358/252 |

*Primary Examiner*—Bruce Y. Arnold
*Assistant Examiner*—Loha Ben
*Attorney, Agent, or Firm*—William L. Chapin

[57] ABSTRACT

An optical filter for use with visual display devices such as cathode ray tubes (CRT's) used with video display terminals (VDT's), television sets and the like enhances the viewability of characters and graphics displayed by increasing the contrast ratio, i.e., relative brightness, between illuminated picture elements (pixels) and unilluminated pixels. The filter comprises a thin, transparent flexible polyvinyl chloride (PVC) plastic film adherable to the faceplate of the CRT or other display device by surface adhesion alone. Dyes are incorporated into the plastic film which color the film subtractively complementarily to the emission color of the display, thereby causing reduced light transmittance for wavelengths close to wavelength of peak light emission of the display device. The filters are attached to the faceplate of the CRT or other display device, by first coating one surface of the film with water, pressing the film against the faceplate, and drawing a straight edge or similar rigid edged surface across the outer surface of the film, thereby squeegeeing water from between the film and faceplate, and adhering the film thereto. A magenta colored filter, subtractively complementarily colored to the peak emission color of CRT having a green phosphor, is used with that color CRT. A bluish colored filter is used with CRT's having an amber colored phosphor. A neutral density, or gray colored filter is used with multi-color and black and white displays.

25 Claims, No Drawings

VIDEO DISPLAY TERMINAL FILTER

BACKGROUND OF THE INVENTION

1. Field of the Invention

This invention relates to an accessory for use with visual display devices of the type employed in video display terminals (VDT's), television sets, and the like. More particularly, the invention relates to a novel filter accessory and method of attachment to the face plate of a cathode ray tube (CRT) or similar display device used in VDT's, for the purpose of enhancing the visibility of characters and graphics displayed on the screen.

2. Description of Background Art

A veritable explosion in information storage and processing capabilities has resulted from the wide distribution of computers in the free world. User access to this information is frequently provided by a video display terminal (VDT), which displays numbers, words and other characters as well as graphical images. The images are usually displayed on a cathode ray tube (CRT), or sometimes on a different type of display device such as a liquid crystal display, or a gas discharge display.

Video display terminals (VDT's), many of which employ CRTs, are being utilized by an increasing number of people. Thus, large numbers of people use VDTs for business, security, military operations, scientific or academic work, computer aided design, or pleasure games and hobbies, to name just a few applications employing VTD's.

A substantial percentage of VDT users are required to spend a large portion of their work day viewing information displayed on the CRT screen of a VDT. Not surprisingly, frequent users of VDTs have found that prolonged viewing of a CRT screen can cause eye strain, and physical and mental fatigue. In a report titled "Symptoms in Video Display Terminal Errors in the Presence of Small Refractive Errors" and published in September, 1988 in the Journal of the American Optometric Association, it was stated that 60 to 81% of those using a VDT for 6 hours or more per day reported experiencing significant eye strain and/or headaches. Aside from the fact that such negative effects of prolonged viewing of a VDT are unpleasant for those who must spend a substantial portion of their time at a computer terminal, resulting eye strain and fatigue can adversely affect job performance, by increasing the likelihood of operator errors or omissions.

A number of factors contribute to operator eye strain which can be caused by prolonged viewing of VDT's. For example, if the ambient light on the CRT face plate is too intense, the brightness of illuminated graphics displayed on the CRT phosphor screen relative to unilluminated areas, i.e., the contrast ratio, is reduced. With a reduced contract ratio, the eye must strain to perceive the displayed image, causing discomfort if the operator is required to view such low-contrast ratio images over a prolonged period.

In addition to viewing difficulties caused by reduced contrast ratios resulting from certain conditions of ambient light illuminating a CRT face plate, specular reflections of light off of the glass CRT face plate can sometimes glare directly into the eyes of the operator, further reducing visibility of images on the CRT screen, and further increasing the discomfort of the operator.

Another undesirable visual effect often encountered when viewing small characters or other images on a CRT screen is the appearance of a "halo" surrounding the illuminated picture elements (pixels). The halo can decrease the "sharpness" or resolution of the illuminated image. Also, halos can appear to overlie adjacent pixels, reducing their visibility.

From the description above, it is evident that a need exists for improving the viewability of images displayed on a CRT or other VDT display device to reduce eye strain, and increase display resolution, thereby increasing the comfort and efficiency of those who must use the VDT for prolonged periods. In response to this need, a variety of types of filters have been proposed, some of which are used in fairly large numbers.

Perhaps the simplest type of CRT filter is a neutral density, or gray filter which absorbs some 10 to 30 percent of light falling on the filter surface. Such filters are generally positioned as close as possible to the front surface of the CRT face plate, usually by attaching the filter to the bezel encircling the CRT. The intended purpose of such filters is to diminish the brightness of halos and glare caused by ambient light reflected off the CRT face plate. However, use of a gray filter has the undesirable effect of reducing the brightness of illuminated pixels and adjacent unilluminated pixels of the CRT equally, negating the desired result of increasing display contrast ratio.

Various types of colored filters have been proposed for use over the face plate of a CRT. Colors used include blue, green, yellow and amber. For the most part such colored filters have achieved little acceptance. This is understandable, since their primary effect seems to be cosmetic, rather than solving the problems of glare, halo, and low contrast ratio.

Another type of filter suitable for use with a VDT consists of a tinted glass plate having a multi-layer transparent dielectric coating on its outer face. The coating substantially reduces reflections of ambient light incident on the outer surface of the face plate. Filters employing anti-reflection coatings are effective in reducing glare. However, the effectiveness of the anti-reflection coating, which may be as high as 90 percent for small angles of ambient light incident on the filter (nearly perpendicular to the surface) decreases rapidly for high angles of incidence. Also, the substrate on which the anti-reflection coating is applied, owing to the nature of the coating process, must be a relatively rigid material such as glass. Additionally, such anti-reflective coatings wear off with cleaning, and they are very difficult to keep smudge free.

A fourth type of CRT screen filter for use with VDT's prevents ambient light at high incidence angles, which could otherwise produce glare and/or image "wash-out" or contrast ratio reduction, from reaching the CRT face plate. This type of filter employs an array of parallel light-shielding strips or threads placed as close as possible to the CRT face plate. The array can be linear, with all of the shielding elements aligned in one direction, or a matrix array, comprising two sets of parallel shielding elements intersecting at right angles to form a rectangular grid structure.

The light shielding elements are opaque, fine threads, such as nylon, or thin opaque strips held in parallel alignment in a transparent matrix and positioned perpendicularly to the CRT screen. The shielding elements in this type of filter function as miniature louvers, and can be reasonably effective in reducing glare from the CRT face plate. However, even though the shielding elements are typically very small in thickness or diameter, the presence of these opaque elements unavoidably causes some loss of image resolution, as well as image brightness reduction.

A fifth type of VDT screen filter uses a thin plastic sandwich which functions as a circular polarizer. The sandwich consists of a linearly polarizing sheet adhered to a "quarter-wave plate" sheet adjacent the CRT screen. Ambient light incident on the outer linearly polarizer layer of the sandwich is linearly polarized in traveling through the polarizing layer to the quarter-wave layer. In passing through the quarter-wave layer, the plane of polarization of the light is rotated 45 degrees. When this ambient light is reflected off the CRT face plate and travels back through the quarter-wave layer, its plane of polarization is again rotated 45 degrees. Thus, when the reflected light arrives at the inner surface of the polarizer, its plane of polarization is rotated 90 degrees with respect to the polarization axis of the polarizer, and is therefore blocked from being transmitted out to the viewer. A disadvantage of circularly polarizing filters is the fact that they reduce screen image brightness by at least 50 percent.

Existing circular polarizing filters, as well as other types of filters, are frequently made of acetate or acrylic plastic sheets. Such plastics scratch very easily, during the course of normal use and cleaning to remove dust particles electrostatically attracted towards the CRT faceplate near which the filter is positioned. The scratches form light scattering regions which degrade viewability of images on the CRT screen, thereby reducing the effectiveness of such filters in achieving the desired goal of decreasing operator discomfort. As a result of their susceptibility to being scratched, acetate or acrylic plastic filters usually must be replaced yearly, or even more frequently. Filters fabricated from glass have a high resistance to scratches, but are more costly to fabricate and pose a safety hazard because of their susceptibility to breakage.

The following United States patents disclose filters intended to enhance the visibility of images displayed on a VDT:

Mortiz, Pat. No. 3,582,189, Jun. 1, 1979, Ambient Light Filter For a Television Receiver: Discloses a light filter for improving the contrast of a television receiver. The filter comprises a thin sheet of acetate butyrate plastic which is manufactured with a plurality of thin opaque strips embedded edgewise to the plane of the sheet, the opaque strips being sandwiched between strips of transparent plastic. The strips are inclined at an angle of 30 degrees to the upper and lower long sides of a rectangular sheet made of the material, which may be removably attached to a television screen to block ambient light coming from above and to the left of the screen from reaching the screen, or rotated 180 degrees to block light coming from above and to the right of the screen.

Keller, Pat. No. 4,504,867, Mar. 12, 1985, Radiation Containment Apparatus and Method: Discloses an X-ray shield for VDT monitors comprising one or more sheets of transparent polyvinyl chloride material attachable to a CRT tube by a plurality of fasteners arranged about the perimeter of the CRT. The sheets may be imbedded integrally with lead or other material to enhance X-ray absorption. At column 6, lines 52–55, it is stated that since polyvinyl chloride sheets come in a number of tints and colors, the screen can be designed so as to be glare resistant.

Fourny, Pat. No. 4,633,322, Dec. 30, 1986, Screen to be Disposed in Front of a Cathode Ray Screen, Comprised by Monofilaments Forming Micromeshes and Having, On One Surface, a Translucent Film: Discloses a glare filter for CRT screens comprising a sheet of woven micromesh materials, such as black polyamide monofilaments. The micromesh material is preferably adhered to a thin plastic film to facilitate handling of the filter, which is fastened to a window shade-type roller secured to the top of a television set, permitting the filter to be unrolled and positioned closely in front of the screen, or rolled back up when not in use.

Australian Patent Specification No. 236,522. Nov. 24, 1958, Edmonds and de Winter, Television Color Screen: Discloses a screen for diffusing light from a television picture tube screen, and if more than one color is used, to give the impression of a color television when used in front of a black and white T.V. The latter version uses a transparent sheet having strips of different colors, the top one-quarter being blue, the middle half amber, and the bottom one quarter green.

Australian Patent Specification No. 242,986, Aug. 5, 1959, Bartsch, Filter Screen for Television: Discloses a transparent filter screen for attachment to the front of a television picture tube by means of suction cups. The filter screen preferably has a white border having a maximum width of ¾", the stated purpose of the border being to assist viewers to focus their eyes on the screen. The color of the screen material may be blue, green, yellow or amber.

A magazine article, "Filters and Television," Radio Craft Magazine, January 1948, Goldsmith, Dr. Thomas T, discloses the use of neutral density filters having a transmittance of 10% to 30% for placement over a CRT screen to improve the contrast ratio of television pictures. The article suggests that the filter may be given a slight tint of soft green, soft blue or soft rose, if desired.

In view of the disadvantages inherent in prior existing VDT screen filters, the present invention was conceived of.

OBJECTS OF THE INVENTION

An object of the present invention is to provide an optical filter for use with video display terminals (VDT's) and other apparatus using a display device such as a cathode ray tube (CRT) to display visual images, the filter improving the viewability of the images.

Another object of the invention is to provide a VDT filter which increases the contrast ratio of image brightness relative to the unilluminated areas of the VDT display.

Another object of the invention is to provide a VDT display filter which increases the contrast ratio of characters and graphics displayed with minimal reduction in brightness of the image displayed.

Another object of the invention is to provide an optical filter for VDT displays which minimizes the "halo" surrounding an illuminated picture element (pixel).

Another object of the invention is to provide an optical filter for VDT displays which is intimately conformable to the surface of the face plate of the CRT or other display device used in the VDT, thereby minimizing the distortion of images displayed.

Another object of the invention is to provide an optical filter for use with VDT displays which is resistant to forming scratches during use.

Another object of the invention is to provide an optical filter for use with VDT displays which as a single model of a manufactured product is adaptable by the user for use on a wide variety of types and sizes of VDT display devices.

Various other objects and advantages of the present invention, and its most novel features, will become apparent to those skilled in the art by reading the accompanying specification and claims.

Various other objects and advantages of the present invention, and its most novel features, will become apparent to those skilled in the art by reading the accompanying specification and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description of the invention contained herein be included within the scope of the invention as defined by the appended claims.

SUMMARY OF THE INVENTION

Briefly stated, the present invention comprehends an improved optical filter for improving the viewability of images produced on display devices such as cathode ray tubes (CRT's) used in video display terminals (VDT's). The VDT filter according to the present invention consists of a thin, flexible transparent polyvinyl chloride plastic sheet, which is cut to the size of the CRT face plate. The vinyl sheet is adhered to the CRT face plate by first coating the rear surface of the sheet with water, and then pressing down on the front surface of the sheet by drawing a rigid straight edge over the surface of the sheet, using a credit card or similar implement for this purpose. When pressed into position, the vinyl sheet remains securely adhered in intimate conformity with the curved face plate of the CRT or other display device.

The optical filtering function performed by the vinyl sheet results from dyes which are used to coat or permeate the sheet. For filters to be used with color CRT's (Red, Green, Blue), or black and white displays, a neutral density, or gray dye is used to treat the filter. Sufficient dye is used to result in an overall light transmission of approximately 60 to 65 percent.

For monochrome displays, whether CRT, gas or plasma discharge, electroluminescent, liquid crystal, etc., the vinyl filter sheet according to the present invention is dyed with a color or combination of colors that are the subtractive complementary color of the peak emission wavelength of the display image. For example, a colored filter having an overall light transmission of 60–65 percent, predominately in the blue portion of the spectrum but tending towards cyan is used with CRT's having an amber phosphor screen. Described another way, the novel colored filters according to the present invention have a reduced light transmission, or notch, at a wavelength near the peek emission wavelength of the display image.

For CRT's having a green phosphor, a filter having a predominately magenta, slightly blue transmission is used. Thus, the filters according to the present invention filters are dyed to produce color transmission which is subtractively complementary to the color of the light emitted by the CRT phosphor or other display element. This color relationship is in contrast with that which would be chosen intuitively, and in contrast to prior art filters in which the color of the filter is matched to the emitted color. But VDT filters made of subtractive complementary colors according to the present invention have proven highly effective in actual tests, for reasons which are not known with certainty, but which will be alluded to in the following description.

DETAILED DESCRIPTION OF THE INVENTION

An understanding of certain important aspects of the present invention may be facilitated by the following brief review of some basic concepts of color science.

Every color in the visible spectrum may be produced by a combination of colored lights of the appropriate intensity and of a particular basic hue. A color television picture tube, for example, produces all of the colors in the visible spectrum by causing a group of three phosphor dots or stripes one for each pixel, to glow at a particular intensity level. Only three different phosphors, each producing a different color, are used. The colors used are red, green and blue, and are referred to as additive primary colors. The name derives from the fact that any color can be produced by combining additive primary colors. Combining the light produced by the red, green and blue phosphors produces white light. Other colors may be produced by the primary color-emitting phosphors according to the following table:

TABLE 1

| | |
|---|---|
| red light + green light = | yellow light |
| red + blue = | magenta |
| green + blue = | cyan |
| red + green + blue = | white. |

An additive complementary color is defined as a color of a which when added to another colored light, "neutralizes" the second colored light, producing white light. Thus, from the table above, a table of additive complementary colors may be formed as follows:

TABLE 2

| Primary Color | Additive Complementary Color |
|---|---|
| Red + cyan (green & blue) = | white light |
| Green + magenta (red & blue) = | white light |
| Blue + yellow (red & green) = | white light. |

As stated above, every visible color in a black universe may be produced by combining additive primary colored lights, (red, green and blue), of the appropriate intensity. Similarly, every visible color in a white universe may be produced by absorbing or filtering out certain colors from a white light source. The colors of the dyes, inks, or other color absorbers required to produce the entire visible spectrum from a white light source, such as a white piece of paper, are yellow, cyan and magenta. These colors may be thought of as "subtractive primary colors." However, since, as indicates by table 1, each of the colors yellow, cyan and magenta is a combination of two pure colors, . . . red green, or blue, the term "primary" as applied to subtractive colors is somewhat of a misnomer.

When an ink of any of the "subtractive primary" colors is printed on a page, or a filter of that color is placed over a white light source, such as a cathode ray tube emitting white light, the following colors are produced:

TABLE 3

| | |
|---|---|
| Yellow filter + white light = | yellow light |
| Cyan + white = | cyan |
| Magenta + white = | magenta. |

When two of the subtractive primary colors are combined, the following colors result:

TABLE 4

| | |
|---|---|
| Yellow (red & green) filter + magenta (red & blue) filter + white light = | red light |
| Cyan (green & blue) + yellow = | green |
| Cyan + magenta = | blue |
| Yellow + cyan + magenta = | black. |

From table 4, it may be seen why the colors red, green and blue are referred to as the subtractive complementary colors for transparent inks, filters, or other spectrally selective light absorbing media. For if red, green and blue absorbers are stacked over a white light source, all portions of the spectrum are subtracted, leaving no light through and therefor causing the appearance of a black, unilluminated area. Also from table 4, the following relationship may be derived.

TABLE 5

| | |
|---|---|
| Red light (or filter) + cyan filter (or light) = | black |
| Green light (or filter) + magenta filter (or light) = | black |
| Blue light (or filter) + yellow filter (or light) = | black. |

From table 5, it might be concluded that placing a magenta filter over the face of a CRT or other display device emitting light primarily in the green portion of the spectrum would be undesirable, since the magenta filter would be expected to strongly absorb the green light. In other words, the spectral transmission of the magenta filter has a transmission notch, or minimum transmission, at approximately the same wave length as the emission peak of the CRT phosphor. However, the present inventor has discovered that when a CRT face is viewed through a subtractively complementary colored filter having an overall white light transmissivity of 60% to 65%, the resolution and contrast ratio of images displayed on the screen is strikingly enhanced.

In a typical test performed by the present inventor, a CRT having a green phosphor with a peak emission centered at about 525 nanometers (nm) was used. A filter made of PVC film was prepared as described in detail below, and dyed to have a primarily magenta, slightly bluish appearing color. As may be inferred from Table 1, a transparent filter which has a magenta-appearing transmitted color transmits red and blue light to a large extent, while absorbing most of the green light incident upon the filter. Thus, the filter dyed as described above has a transmission "notch" or dip centered on the green emission peak of the CRT phosphor. In other words, the color of the dyed filter was made to approximate the subtractive complementary color of the green CRT phosphor.

In the example test referred to, the magenta (blue) PVC filter was adhered to a portion of the face plate of the CRT in a novel manner described below. The filter had an overall white light transmissivity of approximately 60% to 65%. For comparison, a neutral density, or gray, PVC film filter was also fabricated A neutral density filter absorbs light relatively uniformly over a substantial portion of the visible spectrum. Put another way, the spectral transmittance curve of a neutral density filter is relatively flat, consisting of a relatively straight horizontal line over the visible spectrum. The neutral density PVC filter fabricated also had a white light transmittance of 60% to 65%, and was adhered to the CRT faceplate in close proximity to the portion of the faceplate covered by the magenta/blue filter.

The portion of the CRT faceplate covered by the neutral density filter afforded a perceptible improvement in the viewability of characters and graphics displayed on the CRT, relative to unfiltered areas of the CRT faceplate. This improvement was manifested in a reduction in glare, and a reduction in the intensity of halos around illuminated pixels.

By comparison, the portion of the CRT covered by the magenta/blue PVC film filter displayed a dramatic increase in viewability relative not only to the unfiltered portions of the faceplate, but also relative to the portion of the faceplate covered by the neutral density filter. This improvement in viewability was manifested by a very substantial reduction in the intensity of halos around un-illuminated pixels, to the extent that the halos became imperceptible. Also, the contrast ratio and resolution of images displayed on the CRT were greatly enhanced in the area covered by the colored CRT filter.

The dramatic improvement in viewability of a display fitted with subtractively complementary colored filters according to the present invention is a totally unexpected result, and is nowhere disclosed or hinted at in any literature known to the inventor. The reason for the effectiveness of the novel complementarily colored filters according to the present invention is not known for certainty. However, a possible explanation follows.

Most display devices, such as CRT's which emit light at a particular wavelength, such as green, in actuality emit light over a fairly broad wavelength range centered around a discrete wavelength. This distribution of emitted energy usually conforms to a quasi-Gaussian or Lorentzian, i.e., bell shaped curve. For this type of spectral energy distribution curve, the amount of light energy emitted decreases rapidly and smoothly downwards to zero in "tails" on either side of the wavelength of peak emission Thus, for a JEDEC P39 green phosphor having a peak emission wavelength of approximately 525 nm,, the intensity of emitted light is down to about from the value emitted at the peak wavelengths, at 505 nm and 550 nm in the upper and lower tails respectively, down to 25 percent at 500 nm and 565 nm, and down to nearly zero at 470 nm and 620 nm.

Now suppose that an optical filter having a notch or reduced transmissivity, at 525 nm., relative to the transmissivity of the filter at higher and lower visible wave lengths, is placed over a CRT having a P39 phosphor whose emission peak is centered at 525 nm. If the spectral bandwidth of the notch is smaller than the spectral bandwidth of light emitted by the phosphor, emitted light in the tails of the emission curve will be attenuated by the filter less than light near the wavelength of peak emission. Moreover, since the transmission notch for actual filters has sloping, rather than vertical sides, a further reduction in attenuation of light emitted in the tails would be expected. Thus, it is possible that the percentage attenuation of more intense light emitted by bright pixels, in which a significant amount of energy is contained in the tails, is less than the attenuation of light emitted by dim pixels. This effect would account for the observed contrast ratio improvement of the novel complementary colored filters according to the present invention, relative to the results achieved with a neutral density filter.

The improvement in contrast ratio caused by selectively greater attenuation of dim pixels, alluded to above, may be enhanced by any spectral broadening of light emitted by the CRT phosphor for higher cathode ray beam current and brightness levels It is known that the wavelength of peak light emission shifts as a function of cathode beam current for high beam currents, for certain phosphors. This wavelength shift could substantially increase the transmission of bright light emitted relative to dim pixels, substantially increasing the contrast ratio. It is not believed that wavelength shift is responsible for the contrast enchancement observed for the test examples described here.

DESCRIPTION OF THE PREFERRED EMBODIMENTS

As stated in general terms above, the optical filter for VDT displays according to the present invention comprises essentially a thin, transparent film which has a color transmission curve which is substractively complementary to the color of light emitted by the display. The film is adhered to the faceplate of the CRT or similar display device, in a novel manner which will be described in detail below.

The transparent film from which the example optical filters according to the present invention were fabricated was polyvinyl chloride film. The PVC film used was calendered, flexible film having the capability of clinging to a polished glass surface. PVC films which adhere readily to smooth surfaces such as polished glass without the use of an adhesive are sometimes referred to as high-water content PVC films, and are quite flexible. One source of such PVC film is the Catalina Plastics & Coating Company, P. O. Box 399, Sun Valley, Calif. 91353 under the name Hi Stat-Static Cling Vinyl Film.

In some of the example filters fabricated, a PVC film having a thickness in a range from 0.0005 inch to 0.0075 inch (7.5 mils) was found to be suitable for use with monochrome CRT's. For color monitors (red, green, blue) of the type used for multi-colored VDT displays and color television monitors, it was found that thicker PVC, (approximately 15 mils thick) yielded improved visibility relative to that of thinner films. Thicker film was found in general to yield better results because it had a smoother calendered surface than thinner PVC films, resulting in less image distortion than thinner films.

PVC film, of the type described above, was converted into optical filters for use with VDT CRT's by dyeing the plastic film to that color which was subtractively complementary to the color of light emitted by the CRT phosphor.

The dyes used to color the PVC film were dispersed dyes, of the type used in the dyeing of nylon, acetate, and PVC. To produce all of the colors required for the example filters, combinations of three different colored dyes obtained from the Keystone Aniline Corporation 13744 Milroy Place, Santa Fe Springs, Calif. 90670, were used. The stock numbers and structural formulas for each of the three dyes identified above is tabulated below.

TABLE 6

11100 C.I. Disperse Red 1 (Red)
11110 C.I. Disperse Red 1 (Red)

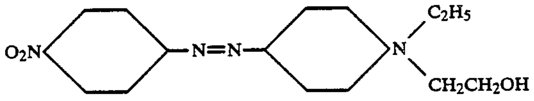

ρ-Nitroaniline ⟶ 2-(N-Ethylanilino)ethanol

I.G., Sw.P 149405
BIOS 961, 79. BIOS 1548, 200
FIAT 764 - Cellitonscharlach B
Daruwalla & Turner, JSCD, 69 (1953), 242
M.p. 160° C.
Soluble in ethanol, acetone and benzene
$H_2SO_4$ conc. - yellowish brown; on dilution - red to crimson
$HNO_3$ conc. - red solution
HCl conc. - red solution
NaOH conc. - re ddish brown solution 11855 Disperse Yellow 3 (Yellow).
11855 C.I. Disperse Yellow 3 (Yellow)
C.I. Solvent Yellow 77 (Bright yellow)

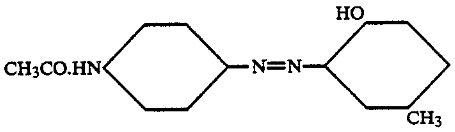

ρ-Aminoacetanilide ⟶ ρ-Cresol

Discoverers - E. Fischer and C. E. Muller 1926
I.G., BP 270351 (void), 269934; FP 632887; GP 469514 (Fr. 16, 1630)
BIOS 961, 77. BIOS 1548, 198
FIAT 764 - Cellitonechtgelb G Plv.
Soluble in ethanol, acetone and benzene
$H_2SO_4$ conc. - orange; on dilution - golden yellow to yellowish brown
NaOH conc. - orange solution 61505 C.I. Disperse Blue 3 (Bright Blue).
61505 C.I. Disperse Blue 3 (Bright Blue)

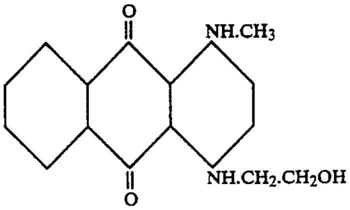

(a) Condense methylamine and ethanolamine with quinizarin and leuco-quinizarin in isobutanol and oxidise
(b) Condense 1-bromo-4-methylaminoanthraquinone with ethanolamine in presence of copper acetate Discoverers - K. Koberle, R. Schweizer, C. Steigerwald, E. Runne, and L. Berlin 1933
I.G., BP 434906, 447037, 447090, 447107, 447108; USP 2051004; GP 638834 (Fr. 23, 988), 722592
BIOS 987, 155; BIOS 1484, 57; FIAT 1313, 2, 206
FIAT 764 - Cellitonechtblau FFR
Soluble in acetone, alcohol, benzene, Cellosolve
Slightly soluble in carbon tetrachloride
Insoluble in Stoddard solvent
$H_2SO_4$ conc. - brown; on dilution - dull red TABLE 6-continued

| |
|---|
| Note - According to BIOS 987, 1,4-bis(methylamino)- and 1,4-bis(2-hydroxyethylamino)anthraquinone are also present |

To produce neutral density or colored PVC film filters according to the present invention, appropriate portions of the three dyes identified above needed to produce a desired color were first mixed at room temperature with de-ionized water. The water was deionized to reduce its surface tension, thereby facilitating even dye distribution on the PVC material. A large sheet of PVC material cut to the appropriate size was then dipped into a tank containing the dye solution, which was maintained at a temperature of 75° F. for approximately 14–15 minutes, for a dye solution concentration of approximately 1.5 grams per liter. The immersion time of 14–15 minutes with the specified dye concentration of 1.5 grams per liter yielded the desired amount of white light transmission of approximately 60 to 70 percent, integrated over the visible spectrum.

It was found that increasing the dye concentration decreased the immersion time necessary to achieve the desired light attenuation. Thus, for example, by increasing the dye concentration to 3.0 grams per liter, the immersion time could be reduced to about 7–8 minutes, to achieve a nominal white light attenuation of about 35%, or conversely, an integrated white light transmittance of about 65%. It was also found that heating the dye solution to about 120° F. reduced the required dyeing time about one-third.

After immersion in an aqueous dye solution for an appropriate period, the PVC film sheet was removed and allowed to air dry, after which the transmissivity of the sheet was measured.

Upon passing the light transmission test, the dyed PVC film sheet was laid flat and cut into individual filter sheets appropriately sized for the various sized CRT faceplates on which the filters were to be used.

It should be noted that the dyeing process described above, when slightly modified, is suitable for coloring harder plastics such as acrylics and polycarbonates. In this case, the aqueous dye solution is heated to about 200 degrees F. while the plastic sheet to be dyed is immersed in the dye solution.

The PVC film filters fabricated as described above are attached to the faceplate of a CRT or other such display device used in a VDT in a novel and highly effective way, as will now be described.

First, the surface of the glass CRT faceplate is thoroughly cleaned, using a water detergent solution or other appropriate cleaning solvent. At least one surface of the PVC film filter is then moistened with water, and pressed against the faceplate. A rigid straight edge, such as the edge of a credit card, is then drawn across the outer surface of the PVC film filter, to squeegee out excess water and air under the filter. Preferably, the outer surface of the PVC film filter is also moistened, to promote smoother squeegeeing. Once this final application step has been performed, the filter is held in place indefinitely. Thus, the novel PVC filter according to the present invention conforms exactly to the curved surface of a CRT faceplate or similar display device, minimizing any possible distortion of images displayed on the screen which might otherwise be caused by different light path lengths or different angles of incidence on the filter surface.

In one of the tests performed, a substantially magenta colored filter was prepared for a CRT having a green P39 phosphor, the phosphor having a peak emission wavelength of 525 nm. The hue of the magenta filter was adjusted to be approximately substractively complementary to the green phosphor emission peak. With an overall white light transmission of approximately 65%, the magenta filter fabricated as described above greatly enhanced the perceived contrast ratio of images displayed on the CRT screen, relative to unfiltered areas of the screen, and relative also to areas covered by a neutral density filter having a transmission of approximately 65 percent.

In another test of the novel filters according to the present invention, a filter was prepared for amber monochrome monitors. In particular, an amber monitor using an L A phosphor obtained from Nichia Chemical Industries, Ltd., Tokoyo, Japan. That amber phosphor has a peak emission wavelength of approximately 590 nm., The subtractive complementary color for that wavelength is a bluish color. With that bluish color filter attached to the screen of the amber CRT monitor, improvements in viewability of images on the screen relative to filtered areas, and to areas over which a neutral density filter was placed, were strikingly evident.

In another set of tests using the novel PVC filter according to the present invention, neutral density (grey) filters having an overall white light transmittance of approximately 65 percent were placed over black and white, and color monitors, respectively. These neutral density filters did improve the viewability of images displayed. But the improvement was not as great as that observed when the complementary colored filters were used with monochrome CRT's.

The nominal value of overall white light transmittance of the novel filters according to the present invention which seemed to optimize viewability enhancement for both neutral density and complementary colored filters was about 65 percent, with a tolerance of about 5 percent. However, it is believed that for certain applications, a transmittance of as low as 50 percent, or as high as 70 percent, may be useful.

It was found that the novel PVC film filters according to the present invention, fabricated and adhered to the faceplate of a CRT as described above, are highly resistant to developing scratches during normal use and cleaning. In contrast to filters having a relatively hard surface, such as those made from acrylic or acetate plastic, the softer PVC material apparently cold-flows in response to the contact of a finger nail or other such object, which would readily scratch a harder material. Apparently, the cold flow prevents scratches from forming in the PVC material.

A substantial and unexpected improvement in viewability of VDT displays results from the use of the novel subtractively complementarily colored filters according to the present invention as described above. The novel use of subtractively complementary colored filter would also be applicable to glass and acrylic optical filters, appropriately colored in accordance with the present invention. Also, the novel concept of using a filter having a notch or transmission minimum which is positioned near a peak emission wavelength of an emitting array, the width of the notch being smaller than spectral bandwidth of the emitter, has possible applications in different portions of the electromagnetic spectrum than the visible portion, and even for non-electromagnetic radiation.

What is claimed is;

1. An optical filter for improving the viewability of images displayed on a visual display device of the type having a faceplate viewing window, comprising a thin, generally uniform thickness, substantially transparent flexible plastic film adherable to said faceplate without the use of an adhesive, said film having an optical transmission property which enhances the brightness of said images on said display device relative to background areas not displaying images.

2. The filter of claim 1, wherein said film is adherable to said faceplate by means of a thin film of water interposed between a rear surface of said film and the front surface of said faceplate.

3. The filter of claim 1, wherein said plastic film is further defined as being polyvinyl chloride.

4. The filter of claim 1, wherein said optical transmission property comprises a relatively uniform degree of absorption over a visible wavelength range including the wavelength of images displayed on said display device.

5. The filter of claim 4, wherein the overall light transmission of said filter, integrated over the visible spectrum, is approximately 60 percent±10 percent.

6. The filter of claim 1, wherein said optical transmission property comprises a spectrally selective light absorbance giving said filter a color which is substantially subtractively complementary to at least one wavelength of peak emission of said images on said display device.

7. The filter of claim 6, wherein the overall light transmission of said filter, integrated over the visible spectrum, is approximately 60 percent±10 percent.

8. The filter of claim 1, wherein said optical transmission property comprises a selectively greater light absorbance for wavelengths near at least one wavelength of peak emission of said images on said display device, than for other wavelengths in other portions of the visible spectrum.

9. The filter of claim 8, wherein the overall light transmission of said filter, integrated over the visible spectrum, is approximately 60 percent±10 percent.

10. A filter for enhancing the contrast ratio between higher intensity radiation emitting locations of a finite spectral bandwidth in a source array, relative to lower intensity radiation emitting locations, comprising a mask superimposable over said source array between said source array and an intended receiving location for receiving radiation emitted from said array, said mask having selectively greater attenuation for radiation wavelengths near the wavelength of peak emission of said array, relative to the attenuation of other wavelengths receivable by said receiving location.

11. The filter of claim 10, wherein said selectively greater attenuation of said filter is further defined as being a notch-shaped transmission minimum at a wavelength near said wavelength of peak emission.

12. The filter of claim 11, wherein said transmission notch has a narrower bandwidth than the spectral bandwidth of said radiation emitted from said source array.

13. The filter of claim 10, wherein said radiation emitted from said source array is electromagnetic radiation.

14. The filter of claim 13, wherein said electromagnetic radiation lies in the visible portion of the spectrum.

15. The filter of claim 14, wherein said mask is an optical filter which is subtractively complementarily colored with respect to a predominate emission color of said source array.

16. An optical filter for enhancing the viewability of images displayed on a visual display device having a faceplate viewing window, said filter comprising a thin, generally uniform thickness substantially transparent plastic film conformable to the surface of said faceplate and adherable thereto without the use of an adhesive, said film having a controlled light absorption characteristic.

17. The optical filter of claim 16, wherein said transparent plastic film is further defined as being polyvinyl chloride film.

18. The filter of claim 17, wherein said controlled light absorption characteristic is further defined as comprising a spectrally selective light absorption peak/-transmission notch at a wavelength near at least one wavelength of peak emission of said images on said display device, the bandwidth of said transmission notch being smaller than the bandwidth of said emission peak.

19. The filter of claim 18, wherein the overall light transmission of said filter, integrated over the visible spectrum, is approximately 60 percent±10 percent.

20. The optical filter of claim 17, wherein said controlled light absorption characteristic is further defined as comprising a relatively uniform degree of absorption over a visible wavelength range including the wavelength of images displayed on said display device.

21. The filter of claim 20, wherein the overall light transmission of said filter integrated over the visible spectrum, is approximately 60 percent±10 percent.

22. The filter of claim 21, wherein the thickness of said polyvinyl chloride film is further defined as having a thickness in a range from 0.0005 inch to 0.015 inch.

23. The filter of claim 17, wherein said filter has a color which is substantially subtractively complementary to at least one predominate emission color of said images on said display device.

24. The filter of claim 23, wherein the overall light transmission of said filter, integrated over the visible spectrum, is approximately 60 percent±10 percent.

25. The filter of claim 24, wherein the thickness of said polyvinyl chloride film is further defined as having a thickness in a range from 0.0005 inch to 0.015 inch.

* * * * *